United States Patent [19]

Grönberg

[11] 4,290,315
[45] Sep. 22, 1981

[54] APPARATUS FOR DETERMINING THE DIFFERENTIAL PRESSURE AND THE VOLUMETRIC FLUID FLOW IN A CONDUIT

[75] Inventor: Pauli Gröberg, Espoo, Finland

[73] Assignee: Fincoil-teollisuus Oy, Vantaa, Finland

[21] Appl. No.: 114,577

[22] Filed: Jan. 23, 1980

[30] Foreign Application Priority Data

Jan. 25, 1979 [FI] Finland ................................. 790235
Jun. 25, 1979 [FI] Finland ................................. 792004

[51] Int. Cl.³ ............................................... G01F 1/42
[52] U.S. Cl. ................................................. 73/861.61
[58] Field of Search ......................... 73/861.52, 861.61

[56] References Cited

U.S. PATENT DOCUMENTS 2,687,645  8/1954  Velten et al. ..................... 73/861.61
3,759,098  9/1973  Logsdon et al. .................. 73/861.52
4,008,611  2/1977  Turocy ............................. 73/861.52

Primary Examiner—Herbert Goldstein
Attorney, Agent, or Firm—Finnegan, Henderson, Farabow, Garrett & Dunner

[57] ABSTRACT

An apparatus for determining the differential pressure and the volumetric fluid flow in a conduit. The apparatus comprises an annular plate means positioned substantially coaxially within the conduit or within an open-ended housing forming part of the conduit. The annular plate means is provided, in its central portion, with an orifice for the fluid flow. On each side of the annular plate means there is a pipe loop provided with a series of ports, such as holes or slots with relatively small dimensions, for sensing the pressure at different points upstream and downstream, respectively, of the plate means. Pressure responsive means are operatively connected to the ports for determining the differential pressure on opposite sides of the plate means. An annular additional passage for the fluid flow is formed between the outer periphery of the annular plate and the inner wall of the conduit or the open-ended housing.

11 Claims, 12 Drawing Figures

APPARATUS FOR DETERMINING THE DIFFERENTIAL PRESSURE AND THE VOLUMETRIC FLUID FLOW IN A CONDUIT

This invention concerns an apparatus for determining the differential pressure and the volumetric fluid flow in a conduit, comprising an annular plate means arranged substantially coaxially within the conduit so as to define an orifice, preferably, in the central portion of the plate means, at least two pipe loops or similar arranged substantially coaxially with and on opposite sides of the plate means and including a number of ports, such as holes or slots with relatively small dimensions, for sensing the pressure at different points upstream and downstream, respectively, of the plate means, and pressure responsive means operatively connected to the ports for determining the differential pressure on opposite sides of the plate means.

In prior art methods and devices for the measurement of the volumetric fluid flow in a conduit, an almost undisturbed (laminar) flow profile is necessary at the measurement point in order to keep the measurement error at a sufficiently low level without any excessive amount of work. Generally, the flow profile in practical installations is not undisturbed enough without special rectification or an equalization means as the flow conduits do not have long enough straight portions in which the flow would be equalized. In some cases a reliable measurement result is not at all obtainable by reasonable means.

Previously, no such measurement and control devices have been available by means of which the volumetric flows could be measured and controlled also in disturbed (turbulent) conditions easily and accurately enough for achieving the wanted results.

Presently, more than half of the energy losses in buildings are due to the ventilation. In the future, the energy saving measures will require a sufficiently accurate control of the energy flows. This will not be possible unless the volumetric flows of the ventilation or air-conditioning plants can be measured more reliably and controlled more easily than now.

It is the object of this invention to create an apparatus for determining the volumetric flow of a fluid, which is primarily suitable for measuring the air flows in ventilation or air-conditioning plants in a manner substantially more accurate than henceforth even athighly disturbed flow profiles. The measurement apparatus is intended to be installed permanently in a ventilation or air-conditioning plant. The measurement apparatus can in different embodiments be used in flow conduits and apertures having a circular, oval, rectangular, or other cross-section.

As prior art, reference is made to the Applicant earlier Finnish Patent Application No. 78 0740. It is another object of the present invention to develop further the measuring methods and devices presented in the above patent applications.

It is a special object of this invention to create such a measuring apparatus by means of which a larger and more accurate scale indication and, hence, a bigger volumetric flow measurement accuracy is obtainable. Another object is to obtain a bigger measurement accuracy particularly at highly disturbed, e.g., asymmetric flow profiles. At any rate, it is possible, by means of the apparatus according to this invention, to achieve easily a measurement accuracy below 5 to 10 percent even under difficult conditions.

The above objects as well as the objects to be mentioned later can be achieved by means of the apparatus according to the present invention. The apparatus is mainly characterizied by an annular passage between the outer periphery of the annular plate means and the inner wall of the conduit.

According to a preferred embodiment of the invention, the measuring apparatus is provided with an annular plate by means of which the necessary pressure differential is obtained. The outer extension (e.g., diameter) of the plate is substantially smaller than the corresponding inner extension (e.g., diameter) of the conduit. On both sides of the plate, there are positioned pipes provided, e.g., on both sides with ports, such as holes with small dimensions or slots, through which the pressure can be determined on both sides of the flow resistance plate. Preferably, the annular plate and the pipes fastened thereto are arranged coaxially with the fllow conduit.

According to still another embodiment of the invention, at least one of the pipe members is positioned at a distance from the annular plate such that at least one hole or slot opens towards the annular plate.

By means of the measuring apparatus according to the invention, among other things, the following practical advantages are achieved:

Flow disturbances do not substantially influence the operation of the measuring apparatus and the measurement accuracy thereof.

The volumetric fluid flow can be determined easily by means of one single pressure differential measurement.

The measuring apparatus can be used at both small and high flow velocities.

The pressure differential is big as compared to the flow resistance caused by the measuring apparatus.

The apparatus has a simple construction.

The pressure differential to be measured remains stable.

By means of the measuring apparatus it is possible to obtain a sufficient measurement accuracy even in a disturbed flow.

The measuring apparatus is suitable for use in flow conduits or apertures having different cross-sections, e.g., in the blow and outlet elements of ventilation plants.

The measuring apparatus is suitable for the measurement of volumetric flows of both gases and liquids.

The flow direction has no influence on the operation of the measuring apparatus.

The measuring apparatus needs no space outside the conduit or aperture.

The measuring apparatus is suitable for use also in connection with a volumetric flow control device as a so-called measuring control device.

In the following, the invention will be described in more detail, reference being made to the embodiments in the accompanying drawings.

Figure 1:
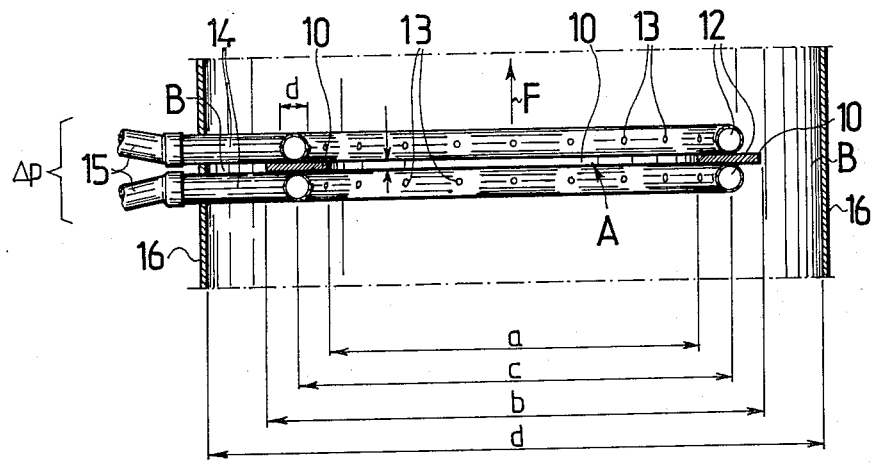
FIG. 1 is an axial sectional view of one embodiment of the measuring apparatus according to the invention as positioned in an air flow conduit.
Figure 2:
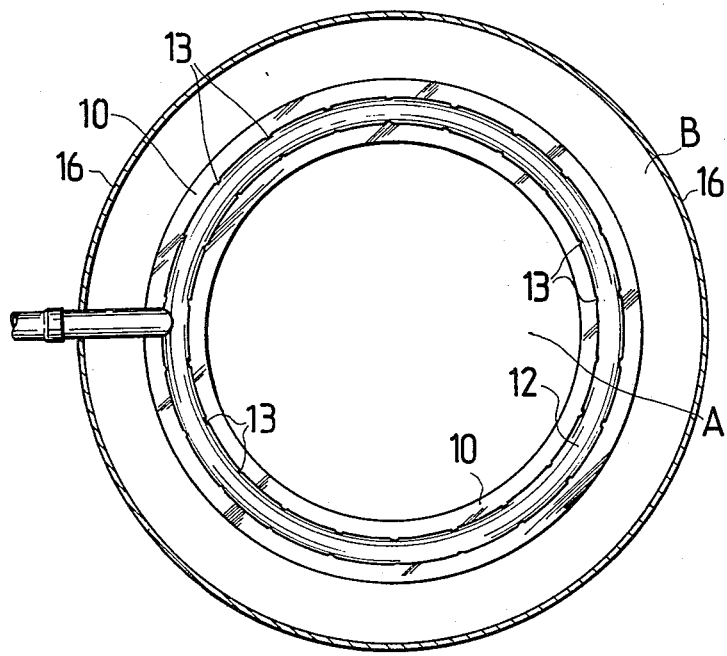
FIG. 2 is a partial sectional view of the embodiment of FIG. 1 as seen in the flow direction.

According to FIGS. 1 and 2, the measuring apparatus comprises an annular plate means 10 having annular pipe loops 12 positioned on either side thereof. The inside of the pipes 12 is connected to the outer side of the conduit 16 by means of tubes 15 the outer ends of which are connected to a pressure responsive means known per se (not shown). The pressure responsive means can, e.g., be a manometer of the type described in the U.S. Pat. No. 3,759,098. The pipes 12 are preferable provided with holes 13 having a small diameter and opening in a direction substantially perpendicular to the flow direction F. Through said small holes, the pressure differential $\Delta p$ caused by the flow resistance, in this case the annular plate 10, is obtained. As regards the measuring method, reference is made to Applicant's earlier Finnish Patent Application No. 78 0740.

The average diameter c of the pipe loops 12 and of the annular plate means 10 is substantially smaller than the diameter d of the flow conduit 16. Said dimension d is substantially bigger than the outer diameter b of the annular plate means 10. Hence, there is formed between the inner surface of the conduit 16 and the outer periphery of the annular plate 10 an annular space B through which part of the flow can pass. In addition, the annular plate means 10 is provided with an orifice A with a diameter a. Through this orifice A, the other part of the flow F in the conduit 16 can pass. The above dimensions a, b, c, and d are chosen such that a maximum measurement accuracy under different measuring conditions is obtained. As an example of a suitable dimensioning, reference is made to the FIGS. 1 and 2 according to which the ratio $d/c \approx 1.3$.

Figure 3:
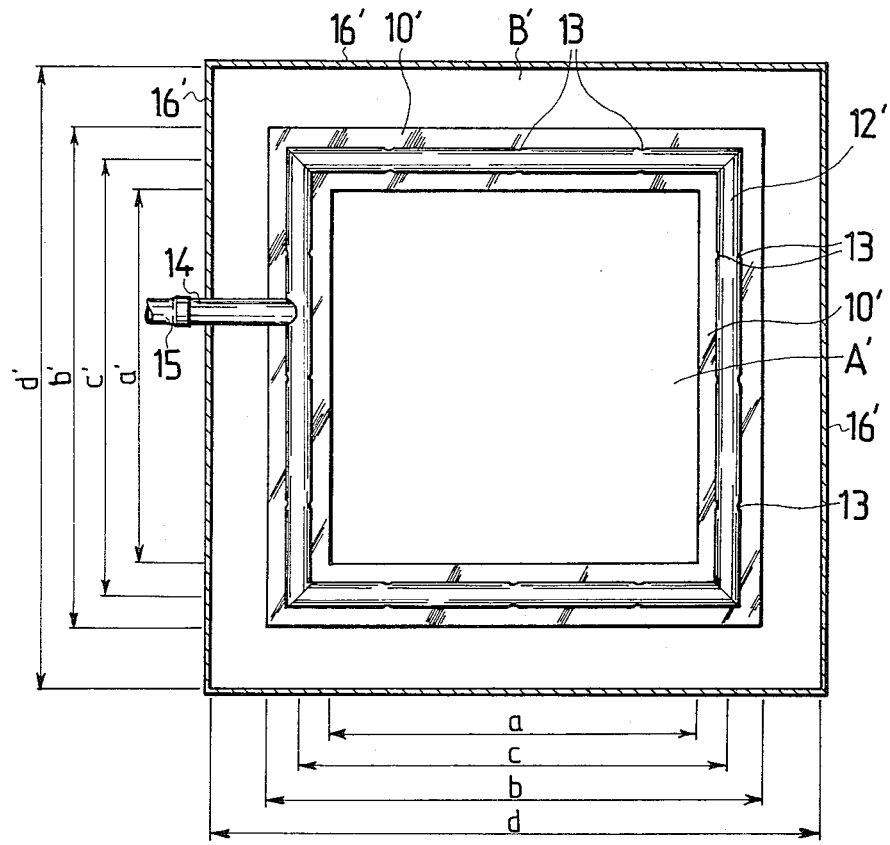
FIG. 3 shows in a manner similar to that of FIG. 2 another embodiment of the invention used in a conduit having a rectangular cross-section.

According to FIG. 3, the measuring apparatus according to the invention is positioned within a conduit 16' having a rectangular cross-section. In this embodiment a rectangular plate means 10' functions as a flow resistance such that it has a central orifice A' and that an annular space B' is formed between the outer edge of the annular plate means 10' and the inner surface of the conduit 16'.

The pipes 12', which are positioned in a manner described above on both sides of the annular plate means 10', are provided both on their outer and inner sides with holes 13 by means of which a representative pressure differential $\Delta p$ is obtained in the rectangular conduit 16'.

By using the annotations of FIGS. 1, 2, and 3, the dimensioning of the flow conduit 16, 16' and the annular plate means 10, 10' can be characterized by the following formulae:

$1 \leq d/c \leq 3$ and $1 \leq d'/c' \leq 3$.

According to one preferred dimensioning $d/c \approx 1.3$.

In FIG. 3, a dimensioning corresponding to that one in FIG. 1 is presented. The dimensions a, b, c, and d represent the above horizontal dimensions of the rectangular plate means and a', b', c', and d' the corresponding vertical dimensions. According to FIG. 3, the walls of the conduit 16' and the rectangular plate means 10' are coaxially positioned.

Figure 4:
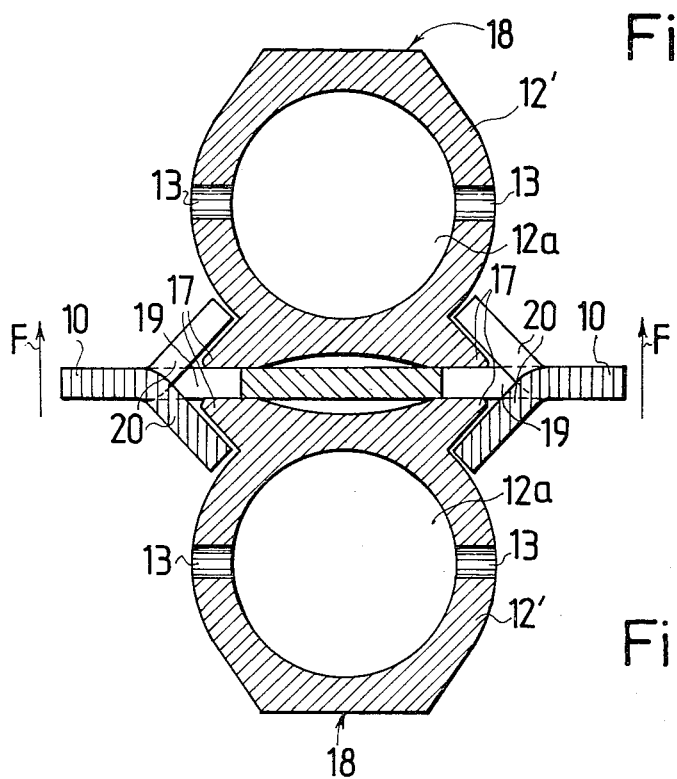
FIG. 4 is a detailed cross-sectional view of a third embodiment of the invention.

According to FIG. 4, two pipe members 12' have been fastened onto the annular plate means 10. The fastening is carried out by bending tongue-like members 20 formed by piercing the material of the inner edge of the annular plate means 10 over brackets 17 formed on one side of the pipe members 12'. The side 18 of the pipe members 12' opposite the brackets 17 is planar. The pipe members are provided with holes 13 with a small diameter as described above. The profile of the pipe member 12' according to FIG. 4 as well as the fastening arrangement are particularly advantageous embodiments of the invention.

Figure 5:
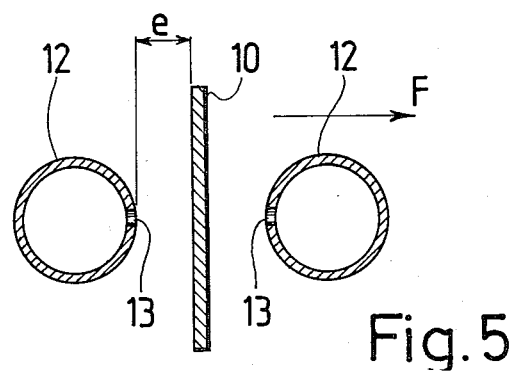
FIG. 5 is a sectional view of one pipe arrangement in an apparatus according to the invention.

According to FIG. 5, both pipe members 12 are positioned at a distance e from the annular plate means 10 having a straight profile. This distance e corresponds to, e.g., 30 to 150 percent of the outer diameter of the pipe member 12. According to FIG. 5, this distance is about 50 percent of the outer diameter of the pipe member 12. The holes 13 in both pipe members 12 open towards each other and towards the plate member 10. By means of this arrangement, a very good and accurate pressure differential measurement between the pipe members can be achieved.

Figure 6:
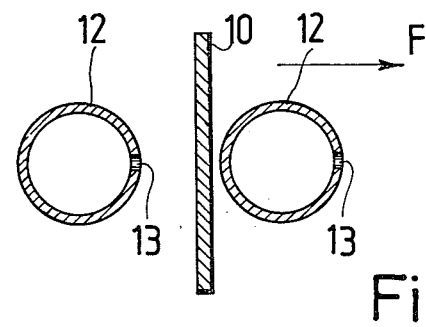
FIG. 6 is a sectional view of a second pipe arrangement in an apparatus according to the invention.

According to FIG. 6, the first pipe member 12 is positioned at a distance e in the flow direction F from the annular plate means 10, whereas the second pipe member 12 is positioned onto or nearly onto the annular plate means 10. In this case, the holes 13 in both pipe members 12 open substantially in the flow direction F.

Figure 7:
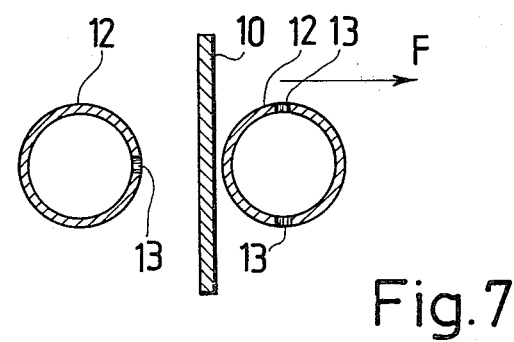
FIG. 7 is a sectional view of a third pipe arrangement in an apparatus according to the invention.

According to FIG. 7, the positioning of both pipe members 12 and the holes 13 in the first pipe member in relation to the annular plate means 10 corresponds to that of FIG. 6. On the contrary, the holes 13 in the second pipe member 12 substantially open transversely to the flow direction F.

It should be observed that, in addition to the positioning of the pipe members 12 and the holes 13 or slots therein, the measurement accuracy can be influenced by changing the profile of the annular plate member 10 in a suitable manner. Such advantageous plate profiles are presented in FIGS. 8 to 12.

Figure 8:
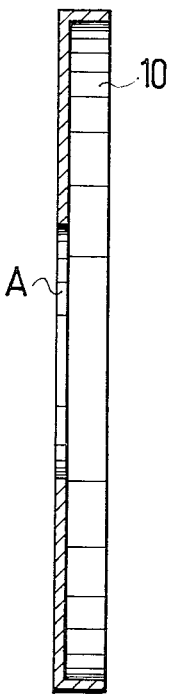
FIGS. 8 to 12 show different alternative profiles of the annular plate means in an apparatus according to the invention.

In FIG. 8, a construction is presented in which the outer edge of the annular plate means is provided with an axial flange.

Figure 9:
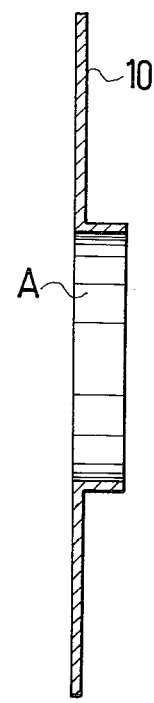

In FIG. 9, a construction is presented in which the inner edge of the annular plate means is provided with an axial flange.

Figure 10:
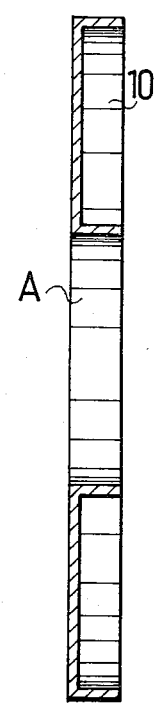

In FIG. 10, a construction is presented in which both the outer and the inner edge of the annular plate means are provided with an axial flange.

Figure 11:
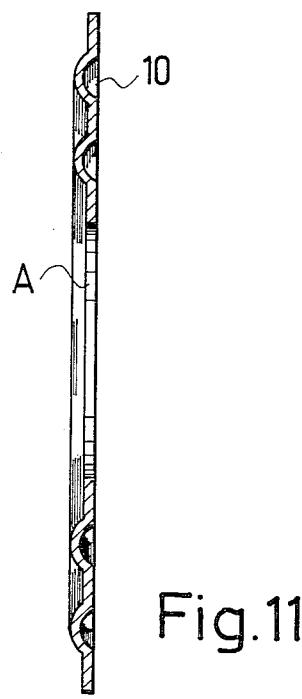
Figure 12:
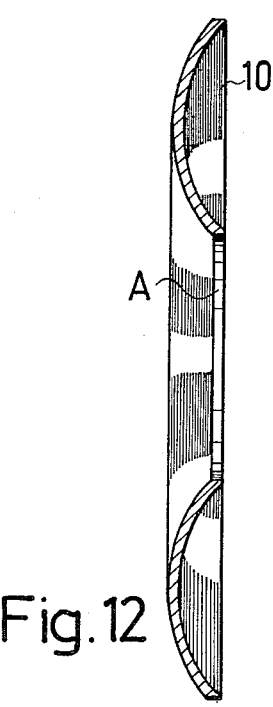

The construction according to FIG. 11 is provided with two coaxial grooves having a curved profile.

The annular plate means according to FIG. 10 has an entirely curved profile such that the profile corresponds to an arc of a circle, e.g., a semicircle.

Although the above embodiments of the pipe members 12 have been provided with holes 13 having a small diameter, it is conceivable within the scope of the invention that, instead of holes, any kind of ports, such as one or several slots or holes having a different cross-section, can be used.

It should be further observed that according to the invention also the second pipe member 12 (as seen in the flow direction F) can be positioned at a distance from the annular plate member 10, whereas the first pipe member 12 can be positioned onto or nearly onto the plate means 10.

The measuring apparatus according to the invention can be applied to very different conduit cross-sections, even to such cross-sections in which the conduit walls form combinations of planar and curved surfaces.

Within the scope of the invention also such applications are conceivable in which more than one combination of pipe members and a flow resistance plate are used and in which said combinations have a form differing from the above preferred closed loop configuration. In one such embodiment two or more coaxial annular plates having a form corresponding to the cross-section of the conduit are each provided with pairs of pipe members 12 such that, in addition to an outer annular passage, additional passages are formed between the coaxial plate means.

The invention is not limited to the above embodiments which have been described by way of example only but can vary within the scope of the inventive idea as presented in the accompanying claims.

What I claim is:

1. Apparatus for determining the differential pressure and the volumetric fluid flow in a conduit, comprising:
   (a) an annular plate means arranged substantially coaxially within the conduit so as to define, on one hand, an orifice in the central portion of the plate means and, on the other hand, an annular passage between outer periphery of the plate means and the inner wall of the conduit;
   (b) at least two pipe loops arranged substantially coaxially with and on opposite sides of the plate means and including a series of ports for sensing the pressure at a plurality of points upstream and downstream, respectively, of the plate means, and
   (c) pressure responsive means operatively connected to each series of ports for determining the differential pressure on opposite sides of plate means.

2. Apparatus as claimed in claim 1, wherein the transversal extension of the pipe loops fall within the inner and outer periphery of the annular plate means.

3. Apparatus as claimed in claim 1, wherein the transversal extension the annular plate means is substantially smaller than the corresponding transversal extension of the inner wall of the housing.

4. Apparatus as claimed in claim 1, wherein the pipe loops are positioned in close relation with the plate means.

5. Apparatus as claimed in claim 1, wherein at least one pipe loop on one side of the plate means is positioned at a distance from the surface of the plate means.

6. Apparatus as claimed in claim 1, wherein at least one pipe loop on both sides of the plate means is positioned at a distance from the surface of the plate means.

7. Apparatus as claimed in claim 5 or 6, wherein said distance is 30 to 150 percent, preferably about 50 percent, of the outer diameter of the pipe.

8. Apparatus as claimed in claim 5 or 6, wherein the pipes are provided with brackets and the plate means with tongue-like members pierced into the inner periphery thereof and co-operating with the brackets for fastening the pipes onto the plate means.

9. Apparatus as claimed in claim 5 or 6, wherein at least part of the ports open towards the plate means.

10. Apparatus as claimed in claim 5 or 6, wherein the ports open substantially in the flow direction.

11. Apparatus as claimed in claim 5 or 6, wherein the ports in the pipes upstream of the plate means substantially open in the axial direction whereas the ports in the pipes downstream of the plate means substantially open in a direction transversal to the axial direction.

* * * * *